Dec. 20, 1938.　　　　W. S. GRAHAM　　　　2,140,622
DRIVE MECHANISM FOR TRACTOR MOUNTED PLANTERS
Filed Aug. 6, 1936　　　3 Sheets-Sheet 1

Inventor
William S. Graham
By V. F. Lassagne
Atty.

Dec. 20, 1938.  W. S. GRAHAM  2,140,622
DRIVE MECHANISM FOR TRACTOR MOUNTED PLANTERS
Filed Aug. 6, 1936  3 Sheets-Sheet 2

Inventor
William S. Graham
By

Patented Dec. 20, 1938

2,140,622

UNITED STATES PATENT OFFICE 2,140,622

DRIVE MECHANISM FOR TRACTOR MOUNTED PLANTERS

William S. Graham, Canton, Ill., assignor to International Harvester Company, a corporation of New Jersey Application August 6, 1936, Serial No. 94,593

6 Claims. (Cl. 111—59)

This invention relates to implement attachments for tractors and, more specifically, to a hill drop driving mechanism for a planter attachment of the direct connected type mounted on a tractor.

The main object of the invention is to provide a flexible drive mechanism for a plurality of planter drop mechanisms mounted on a tractor.

Another object of the invention is to drive the hill drop mechanism of each planter proportionally to the rate of travel of the tractor.

Another object of the invention is to provide a releasable support for the driving mechanism in case an obstruction is encountered.

A more specific object of the invention is to provide a flexible and telescopic drive between the main driving mechanism and the hill drop mechanism.

Other objects and advantages will appear in the following description of the preferred embodiment of the invention, as illustrated in the accompanying drawings, wherein.

Figure 1:
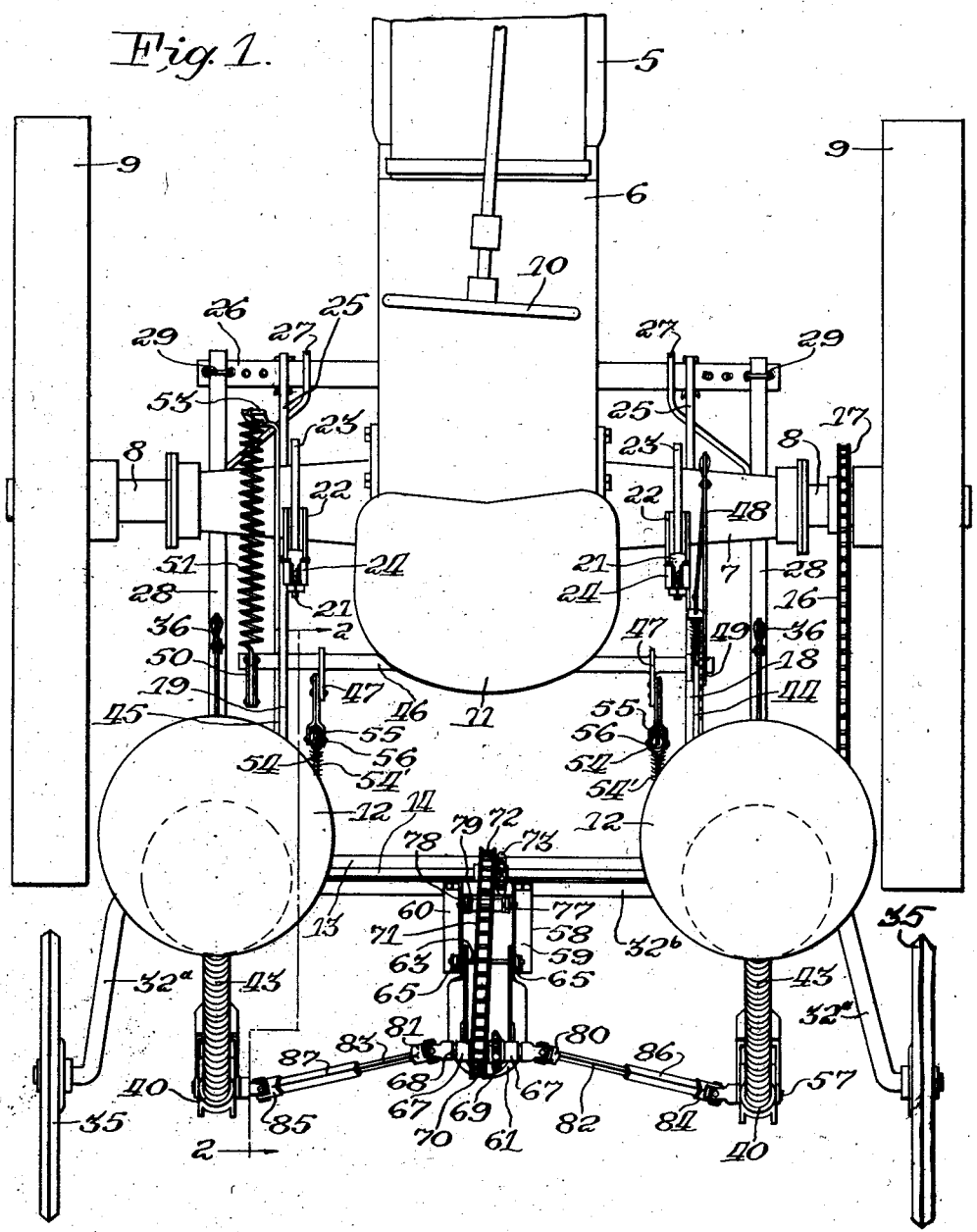
Figure 1 is a plan view of the rear end of the tractor showing the planting attachment and its hill drop driving mechanism in position.

The invention is herein disclosed in combination with a tractor comprising longitudinal frame members 5 connected at their rear ends to a longitudinal transmission housing 6 to which rear axle housings 7 are attached. In the transverse axle housings 7 are journaled differentially driven axle shafts 8 which drive each of the tractor wheels 9. The rear wheels 9 are adjustable laterally on the rear axle shafts 8 in order to conform to the various row spacings. The tractor is steered through a steering wheel 10 adjacent an operator's station 11. The tractor has the usual power take-off shaft which may be used to drive other attachments. It is also to be understood that the tractor may take other modifications of well-known commercial type constructions.

Figure 2:
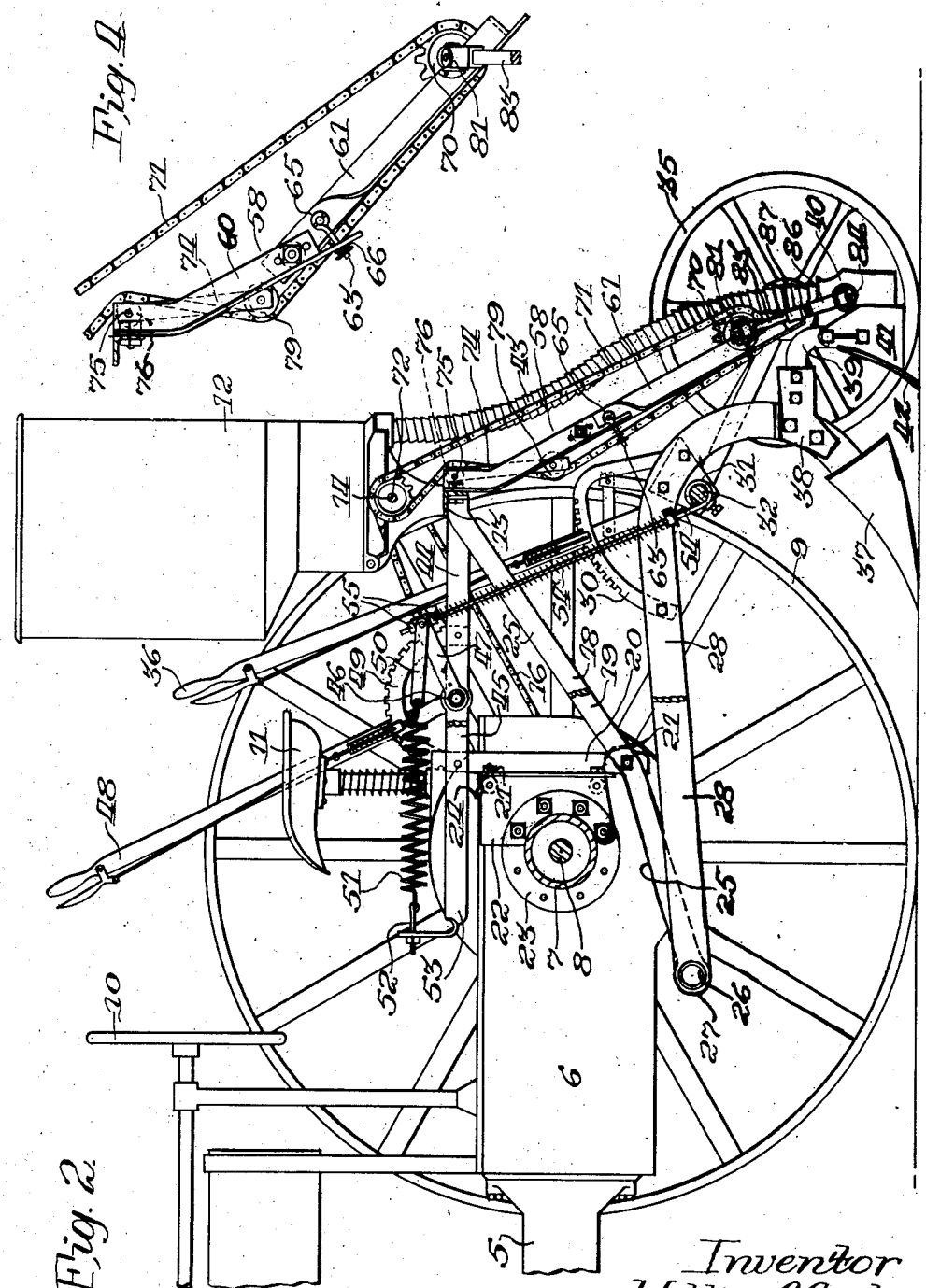
Figure 2 is a side elevation of the rear end of the tractor with the left rear wheel removed, showing the planter attachment with its hill drop driving mechanism in position; and part of said planter is in section which is taken along line 2—2 of Figure 1.
Figure 3:
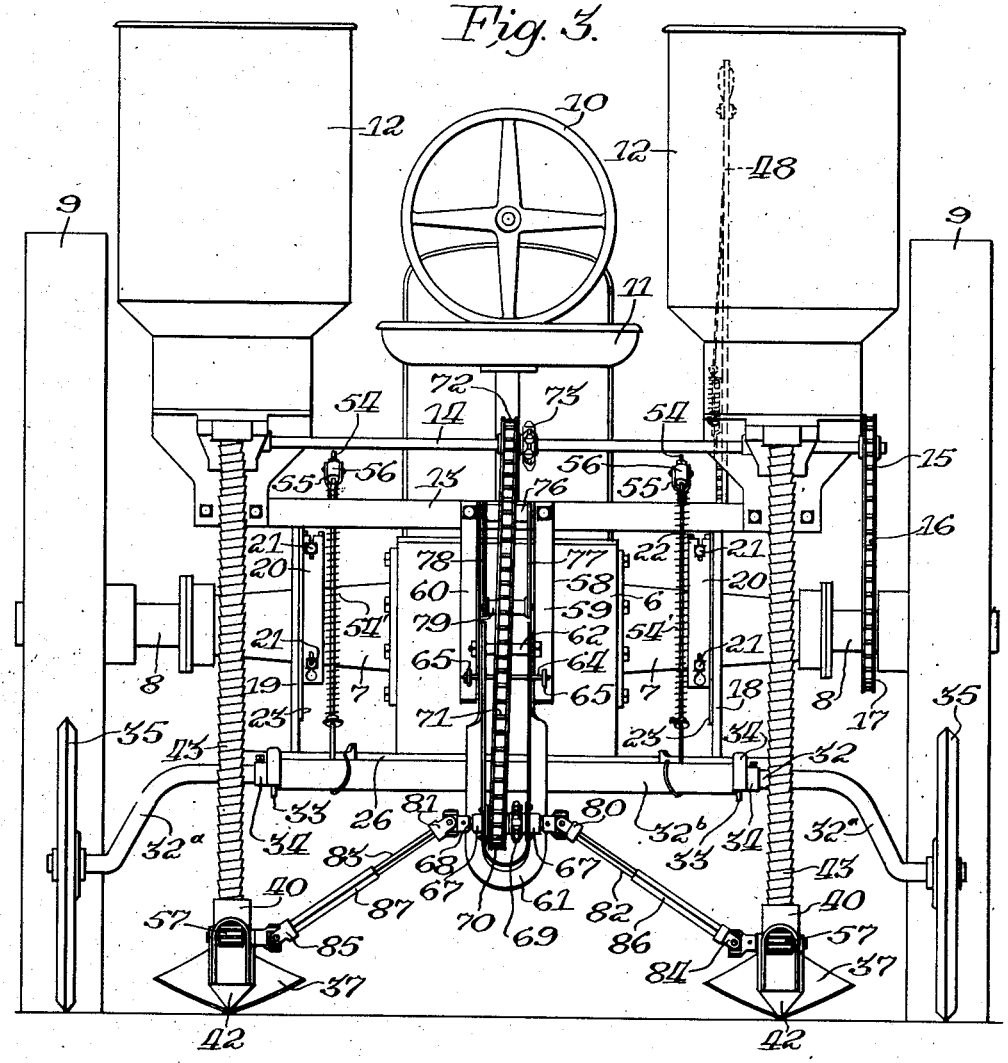
Figure 3 is a rear view of the planter attachment attached to the tractor showing the hill drop driving mechanism; and, Figure 4 is a detail section of the releasable support with the hill drop driving mechanism.

Figures 1, 2, and 3 show the supporting structure attached to the tractor for supporting the planter and its mechanism through which the seed plates and valves are driven.

The planter attachment is similar to that disclosed and claimed in the assignee's copending application of A. C. Lindgren et al., Serial No. 1,608, filed January 14, 1935. The planter attachment comprises the usual seed hoppers 12 attached to a transverse support 13. The seed mechanisms of the two hoppers 12 are driven by a laterally extending shaft 14 to which is mounted a sprocket 15 driven by a chain 16 and sprocket 17 mounted on the rear axle 8. The transverse support or frame 13 for the seed mechanism is firmly attached to the apex of two triangular shaped brackets generally indicated at 18 and 19. Base members 20 of the triangular brackets have slots therein formed in alignment with attaching bolts 21 of a coupling member 22. The coupling member 22 is rigidly secured to a flange 23 which is integral with the axle housings 7. To provide ease in attaching the planter attachment to the tractor, when it is backed into attaching position, a support 24 is formed integral with the upper part of the base member 20 which is in the form of an angle iron. The support 24 has a notch cut out for the upper bolt 21 to be pivoted therethrough and it also has an upwardly extending part which acts as a guide on the upper surface of the coupling bracket 22. The attaching bolts 21, when secured firmly, attach the supports for the planter attachment to the tractor.

Hypotenuse like members 25 of the triangular brackets 18 and 19 are shaped to extend downwardly to a point below and rearward of the rear axle housings 7, then forwardly underneath the axle housings, as best shown in Figure 1. At the forward ends of the members 25 and secured thereto, a transverse draft member 26 extends laterally through the said members 25 and outside thereof to permit ends 27 of lister beams 28 to be adjusted laterally for rows of various widths. A series of holes are provided at each end of the transverse member 26 for different row widths. U-shaped pins 29, dropped down and astraddle the ends of the beams into a pair of these holes, hold the beams in their laterally adjusted positions. In order to limit lateral shifting movement of the beams 28 on the transverse member 26, their forward ends 27 are preferably bifurcated or forked. This may be done in any manner but preferably by securing, such as by welding, or other means, a strap to the side of the beams, as shown in Figure 1. At the rear ends of the lister beams are secured adjusting quadrants 30 and supporting brackets 31 in which a transverse U-shaped axle 32 is pivoted. The U-shaped axle is made up of two stub axles 32ª pivotally secured in the ends of a horizontal pipe member 32ᵇ. The horizontal pipe member 32ᵇ has secured at its outer ends flange members 33 over which are journaled adjusting collars 34. The adjusting collars 34 are secured to the axles 32ª and permit the lateral adjustment of the axles relative to the pipe member 32ᵇ. Depth regulating wheels 35 are mounted on the stub axles 32ª. Adjusting levers 36 for each stub axle are pivotally mounted on the stub axles 32ª and are in turn secured in adjusted position by the adjusting quadrant 30. The levers 36 are adjustable about the quadrants 30 and extend to within reach of the operator's station 11.

Attached to the lower ends of the plow beams 28 are sweeps 37 which are used to level off the ridges in order that the seed may be dropped a uniform depth. Attached to the beams 28 and extending rearwardly therefrom are brackets 38 to which is attached a downwardly extending shank 39. Attached at the lower end of the shank 39 is a seed boot 40. Ahead of the seed boot 40 and adjustably mounted is a supporting bracket 41 to which is attached a shovel point 42 which opens the furrow in which the seed is dropped. It is to be understood that to the rear of the seed boot 40 and attached to the brackets 38 and plow beam 28 may be attached the covering devices. These covering devices have not been shown as they are not necessary for the understanding of the invention and they may take any conventional form. The seed hoppers 12 are connected by flexible seed tubes 43 in the usual manner.

Midway of horizontally positioned legs 44 and 45 secured to the members 20 and 25 of the triangular brackets 18 and 19, respectively, is pivoted a transverse rockshaft 46 on which are mounted lifting arms 47 and an adjusting lever 48 for raising and lowering the lister beams 28. The lever 48 is adjustably secured about a quadrant 49. To throw the planter mechanism in and out of gear as the lister beams are raised or lowered, there is suitable clutch throw-out mechanism which is not described, as it is not necessary for the understanding of my invention. To the left of the left lifting arm 47 is pivoted a link 50 to which one end of a counterbalancing spring 51 is secured. The other end of the spring 51 is adjustably fastened by a thread link 52 to a forwardly extending portion 53 of the horizontal leg 45.

To raise and lower the lister beams 28, lifting rods 54, as best shown in Figure 3, are used. The lifting rods as used may also be employed to exert spring pressure upon the cultivator beams 28, if necessary, the springs 54' also acting as release springs, if an obstruction is encountered. However, the lifting rods 54 may be rigidly held in place by the adjusting collars 55, as best shown in Figures 2 and 3. The pressure rods 54 are bent in a hook shape at their lower ends and are positioned about the pipe 32ᵇ. At their upper ends the lifting rods are slidably mounted in a pivoted lost motion connection 56. The lever 48 is used to raise the beams 28 in transporting and to adjust them to working position. The levers 36 are used to adjust individually the stub axles 32ª to which the gauge wheels 35 are attached to overcome the inequalities of the planting depths as, for instance, in working on side hills.

The seed boots 40 are the type used in hill drop planting or bunch planting. This type of seed boot has the usual rotary drop valve 57 driven from some suitable outside source of power, and the valve is so mounted as to rotate upon a horizontal axis. In using this rotary drop valve type of seed boot, the seeds which are dispensed from the upper hoppers 12 by the usual seed plates within, gravitate down the seed tubes 43, where, as they are collected, they are dispensed in bunches at suitable set spacings governed by the speed of the driving mechanism. The spacing of the bunches is uniform and is independent of the speed of travel of the tractor. However, the bunches are dropped at definite spacings previously ascertained and this spacing of the hills may be changed by the changing of sprockets, or by other similar mechanism. The rotary valves 57, in this invention, are operated by suitable mechanism which is flexible in nature and is driven from the transverse shaft 14 which drives the seed mechanism of the hoppers 12. A support 58 for the rotary drop valve drive mechanism comprises laterally spaced supporting members 59 and 60 rigidly secured to the transverse support 13 of the planter attachment. The members 59 and 60 are downwardly extending or inclined downwardly and rearwardly and have pivoted at their lower ends a U-shaped sprocket support 61. The upward ends of the U-shaped sprocket support 61 are positioned between the members 59 and 60. The support 61 is mounted for a vertical swinging movement. The members 59 and 60 are suitably spaced apart by a stud 62. The sprocket support 61 is held in its normal position by a spring release 63 comprising means for retaining said support in its normal position. The spring release 63 comprises a transverse member 64 extending between the upper portion of the legs of the sprocket support 61. The ends of the transverse member 64 have attached thereto hook bolts 65, as best shown in Figures 2 and 4. The hook bolts 65 are slidably mounted in the leg portions of the members 59 and 60 and there is positioned on the hook bolts compression springs 66 for holding the sprocket support 61 in its normal position, as shown in Figure 2. In Figure 4 the U-shaped sprocket support 61 is shown moved vertically upward from its position, as shown in Figure 2, as would be the case if an obstruction had been encountered by one or both of the plow beams 28 causing an overload of said spring release 63 or means for retaining said support in its normal position. With this construction it is obvious that a novel safety feature in the form of yieldable supporting means has been provided in the drive mechanism for the rotary valve of the seed boots 40. At the lower end of the U-shaped sprocket support are mounted brackets 67 in which is journaled a shaft 68 to which sprockets 69 and 70 are attached. The sprockets 69 and 70 are driven through a flexible chain 71 from the transverse shaft 14 by means of a driving sprocket 72 attached thereto. In order to change the spacing of the hills dropped by the rotary valve 57, it is necessary to shift the chain from one of the driven sprockets as 70 to another driven sprocket as 69. Various spacings may be obtained also by shifting the chain from the driving sprocket 72 to another driving sprocket 73 secured to the transverse shaft 14. It is obvious, therefore, that several combinations of spacings may be obtained by the shifting of the chain 71 to different driven sprockets or by shifting the chain on different driving sprockets and also other speeds may be obtained by retaining the chain on one driven sprocket and shifting the chain to one of the driven sprockets. Also, it is obvious that the chain may be retained on one of the driven sprockets and shifted on the driving sprockets. With this means of interchanging the chain from one sprocket to another on the driving and driven shafts, it is obvious that several spacings may be obtained. In order to tighten the chain, a chain tightener in the nature of a gravity actuated chain tightener 74 is pivotally mounted at its upper end on a transverse shaft 75. A roller 76 is also mounted on this transverse shaft over which the underside of the chain 71 passes. The chain tightener 74 has rotatably mounted between roller supports 77 and 78, the roller 79 which bears against the chain 71 to take up the slack of the chain. With this type of drive it is necessary that there be some slack in the chain 71 in order that the chain may be shifted back and forth on the different sprockets and also because of the releasable support of the lower driven sprockets. It is thus obvious that the chain tightener 74, as it is gravity actuated, will function to keep the chain taut at all times, therefore, preventing the chain from jumping off the sprockets. The rotary valves 57 for each of the seed boots 40 are driven from the transverse shaft 68 through flexible drive connections in the nature of telescoping shafts and universal joints which comprise with their associated members driving mechanism for driving said valve means. Secured to each end of the transverse shaft 68 are universal joints 80 and 81 to which are secured square drive shafts 82 and 83. Attached at the inner end of the drive shaft for each rotary valve 57 of the respective laterally positioned seed boots 40, are universal joints 84 and 85. Each of these universal joints 84 and 85 is in turn connected to the respective square drive shafts 82 and 83 by hollow square slip shafts 86 and 87, respectively. The telescoping shafts and their respective universal joints form a flexible driving shaft. It is, therefore, obvious that any slight lateral or vertical movement of the seed boot with respect to the transverse drive shaft 68 is taken up by the telescoping members 82 and 86 and 83 and 87. Where further upward movement is needed as in the case of the ground engaging member striking an unusually high obstruction, the U-shaped sprocket support 61 is permitted to have upward pivotal vertical movement about the stud 62 on the members 59 and 60, as shown in Figure 4, and when the obstruction is passed spring pressure of the spring 66 returns the support to its normal position. Also in the case of any direct encounter of the U-shaped member with an obstruction, the member 61 will pivot and prevent the drive mechanism from being damaged.

It is, therefore, seen that a novel drive mechanism has been provided between two laterally positioned seed dropping mechanisms which are driven from the forward travel of the tractor by a sprocket secured to the axle of the tractor, the motion of which is transmitted through the chain 16 to the transverse drive shaft 14 of the seed plate mechanism in the hopper comprising means for driving said drive mechanism and then through suitable interchanging speed drive mechanisms to the laterally positioned seed boots. It is also seen that a very flexible mechanism has been provided whereby any changes in position of the seed boots will be taken care of in the telescopic connections and the universal joints in the driving mechanism. The telescopic joints in the drive connection between the seed boots and the main drive mechanism also provide simple connections for the separation of parts in manufacturing and assembling.

In the operation of the rotary drop valves 57 of each seed boot 40, the motion of the tractor wheels 9 is transmitted through the chain 16 which, in turn, drives the transverse shaft 14. The motion of the transverse shaft 14 is then transmitted by the chain 71 to the transverse shaft 68 which, in turn, drives each rotary valve 57 through their respective telescopic connections 82—86, and 83—87.

It is also obvious that a planter attachment has been provided which may be quickly attached to and detached from the tractor by simply loosening the nuts on the pivoted bolts 21 and swinging them out of position from the supports 20.

The preferred embodiment of this invention herein described is capable of certain modifications without departure from the scope of the invention defined in the following claims.

What is claimed is:

1. The combination with a wheeled frame, of an implement attachment mounted on said frame comprising a transverse frame and a ground engaging member, valve means adapted to be driven mounted on said ground engaging member, downwardly extending driving means with respect to the implement attachment for driving said valve means, vertically yieldable supporting means secured to the aforesaid transverse frame for supporting the aforesaid driving means, and a flexible and telescoping driving means driven by the aforesaid downwardly extending driving means at its lower end and connected to said valve means for driving said valve means, said yieldable supporting means and said flexible and telescoping driving means permitting relative movement of said ground engaging member with respect to said supporting means.

2. The combination with a wheeled frame, of an implement attachment mounted on said frame comprising a transverse frame and a plurality of laterally spaced ground engaging members mounted for vertical adjustment, valve means adapted to be driven mounted on said ground engaging members, a substantially centrally positioned driving means with respect to the implement attachment for driving said valve means, vertically yieldable supporting means secured to the transverse frame for supporting the aforesaid driving means, a plurality of flexible and telescoping driving means driven by the aforesaid centrally positioned driving means at its lower end and connected to said valve means for driving said valve means, said yieldable supporting means and said flexible and telescoping driving means permitting relative movement of said ground engaging members with respect to said supporting means.

3. The combination with a motor propelled wheeled frame, of an implement attachment mounted on said frame comprising a transverse supporting member and a vertically movable ground engaging member having valve means adapted to be driven, a transverse drive shaft mounted on said transverse supporting member, means for driving said drive shaft from the motor, centrally positioned driving mechanism with respect to the implement attachment, a releasable supporting means secured to the aforesaid transverse supporting member for supporting said driving mechanism, said supporting means comprising a fixed support attached to the transverse supporting member, a movable support pivoted on said fixed support, and means for retaining said pivoted support in its normal position except upon an obstruction being encountered by the aforesaid ground engaging member when said pivoted support is yieldable, said driving mechanism comprising a transverse driven shaft mounted on said pivoted support for driving the aforesaid valve means.

4. The combination with a wheeled frame, of an implement attachment mounted on said frame comprising a transverse supporting member, a transverse drive shaft mounted thereon, a plurality of transversely positioned shafts below the transverse drive shaft, centrally positioned driving mechanism with respect to the aforesaid transverse supporting member adapted for driving the aforesaid transversely positioned shafts, said driving mechanism comprising a transverse driven shaft intermediate the aforesaid transversely positioned shafts, a plurality of sprockets on said first mentioned transverse drive shaft and said last mentioned transverse driven shaft, a flexible drive connection between said sprockets on each of said shafts, and a tightener for said flexible drive connection whereby said flexible drive connection may be changed on the various sprockets to change the speed of said transverse driven shaft with respect to the transverse drive shaft.

5. The combination with a wheeled frame, of an implement attachment mounted on said frame comprising a vertically movable ground engaging member and a supporting member, driving mechanism mounted on said supporting member, a vertically yieldable supporting means for said driving mechanism, said supporting means comprising a fixed support attached to the first mentioned supporting member, a movable support pivoted on said fixed support and normally rigid with respect to the fixed support, and means for retaining said pivoted support in its normal position but permitting vertical movement of said pivoted support with respect to the fixed support upon an overload of said retaining means caused by an obstruction being encountered by the aforesaid ground engaging member.

6. The combination with a wheeled frame of an implement attachment mounted on said frame having laterally spaced ground engaging members mounted for vertical adjustment, valve means adapted to be driven mounted on each of said ground engaging members, downwardly extending driving means for driving said valve means, laterally extending driving means for each ground member driven by said downwardly extending driving means at its lower end, and each of said laterally extending driving means connected to its corresponding valve means for driving said valve means of the respective ground members.

WILLIAM S. GRAHAM.